Aug. 15, 1944. W. L. CRAIG 2,355,953
METHOD OF COATING
Filed May 28, 1942
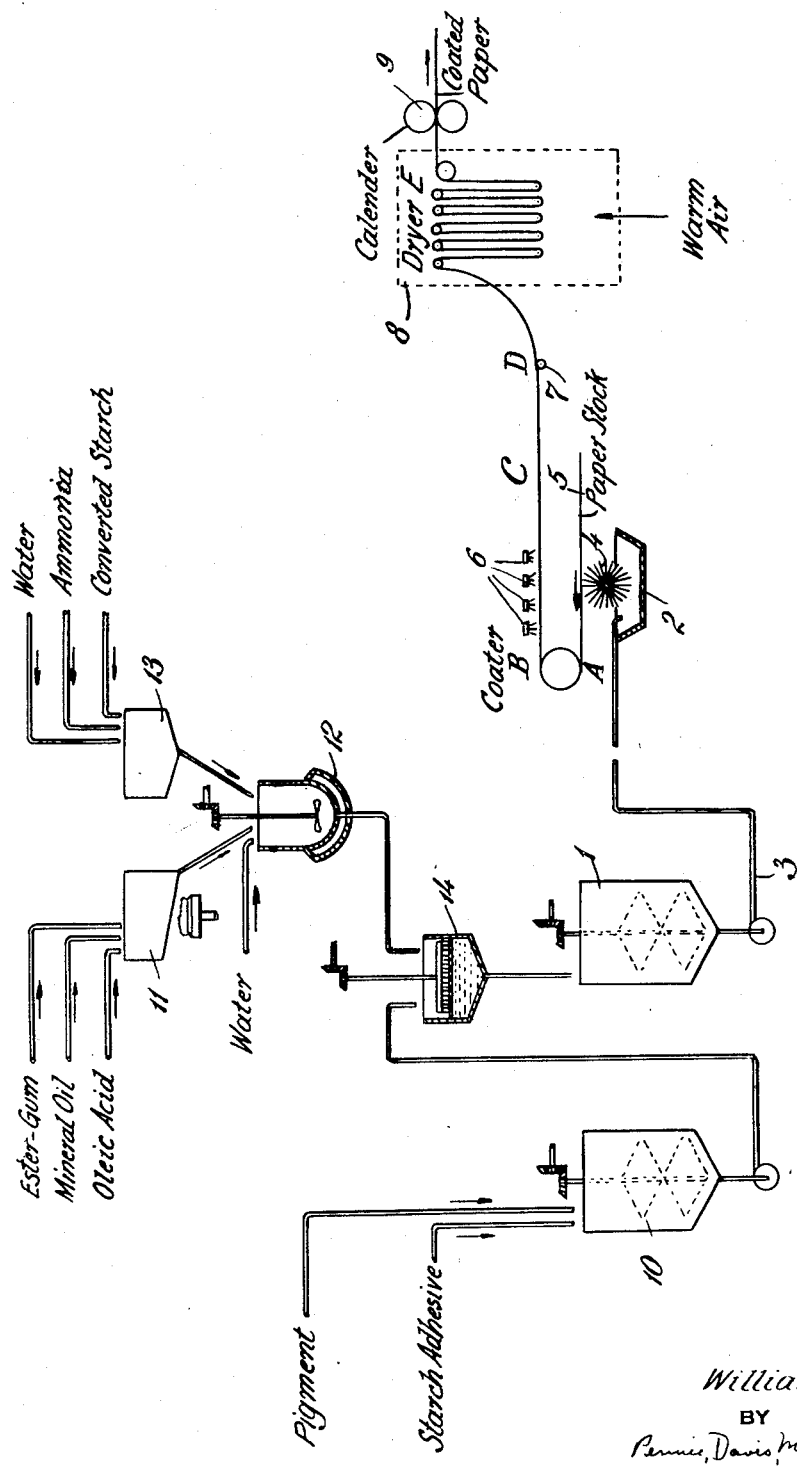
INVENTOR
William L. Craig
BY
Pennie, Davis, Marvin & Edmonds
ATTORNEYS Patented Aug. 15, 1944

2,355,953

UNITED STATES PATENT OFFICE 2,355,953

METHOD OF COATING

William Lutton Craig, Westport, Conn., assignor to R. T. Vanderbilt Company, Inc., New York, N. Y., a corporation of New York Application May 28, 1942, Serial No. 444,839

4 Claims. (Cl. 117—156)

My invention relates to improvements in the manufacture of coated paper. The coated paper of my invention is particularly useful in applications such as lithographic printing requiring that the surface of the paper be water resistant but wettable. My invention makes starch adhesives available for the manufacture of such paper.

Paper for lithographic printing, such as the widely practiced offset printing, has hitherto been surfaced with a coating pigment and a casein adhesive. Increasing cost and decreasing availability of casein, however, have made it essential to find a substitute. Attempts have been made to use starch adhesives in the manufacture of such paper based on their use in the surfacing of other types for other applications, but these attempts have not been successful because of the special requirements of lithographic printing.

In lithographic printing a stone, or a plate usually of aluminum or zinc, carries the image to be reproduced as a greasy impression on its surface, this surface is wet first with water or an aqueous dope and then with a greasy ink, the water adheres to the non-greasy portions of the surface and the ink to the greasy portions, and this ink-water reproduction of the image is then transferred as a film to the paper by pressing the surface of the stone or plate against the paper. In the offset modification of lithographic printing, the procedure is the same except that the ink-water reproduction of the image, instead of being transferred directly from the stone or plate to the paper, is transferred first to the surface of a blanket on an additional roll, the "offset" roll, and then from this blanket to the paper. After transfer, the ink-water film is dried, leaving the image reproduced in ink.

In either case, the surface of the paper must be wettable to receive the image properly yet must withstand the water impressed on its surface. Permanent degradation of the surface, resulting from the wetting, renders the image fugitive and the surface imperfect. Temporary degradation interferes with continuous operation of the press, through accumulations of coating pigment and associated adhesive in the press mechanism, and tends to involve destruction of the transferred image by weakening the bond between the ink-wet parts of the surface and the paper proper particularly when the ink comes into contact with other surfaces before complete drying. Furthermore, the surface is destroyed if the wetting tends to extract some component of the coating. At the same time, since the definition of the reproduction depends upon the mutually repellent properties of adjacent portions of ink and water in the film, the surface of the paper must be wettable by the aqueous as well as the ink portions of the film.

Starch adhesives, applied as they are conventionally, do not produce a surface meeting these requirements. They therefore cannot be substituted, directly, for casein adhesives.

I have found, however, that a surface satisfactory for lithographic printing, for example, can be produced by applying the coating pigment to the paper in an aqueous medium with a starch adhesive and an emulsion of a water resistant agent, dehydrating the applied film and breaking the emulsion during dehydration. Conventional coating procedures, conventional coating pigments, conventional starch adhesives and conventional water resistant agents can be used in carrying out my invention. In carrying out my invention, however, a new result is achieved, namely the production, with a starch adhesive, of a coated paper with a wettable surface sufficiently water resistant to be satisfactory for lithographic printing or other uses imposing similar requirements.

It is essential, in carrying out my invention, that the emulsion of the water resistant agent be broken during dehydration of the coating on the paper to which the coating composition has been applied. If the emulsion breaks before this it tends to form aggregates which interfere with the production of a smooth and uniform surface free from imperfections. If it persists beyond this a proper dispersion of the water resistant agent through the coating formed during dehydration is not secured. The surface characteristic of my invention is secured by breaking the emulsion during dehydration of the applied film of coating composition.

One advantageous means for controlling the emulsion is to stabilize it with ammonia. Then, the ammonia being liberated during dehydration, the emulsion will break as required to produce a satisfactory surface. Other volatile bases, such as the low boiling water soluble alkyl amines, can be used with similar advantage in place of ammonia.

I have also found that a water repellent plasticizer for the coating pigment is with advantage included in the coating composition used for carrying out my invention. The inclusion of such a plasticizer further improves the properties of the coated paper, particularly with respect to calendering after application of the coating and with respect to folding.

The accompanying drawing diagrams the practice of my invention with one type of coating apparatus, a brush coater. My invention may be practiced with other types, a roll coater for example.

Referring to the drawing, the coating composition, comprising the coating pigment in an aqueous medium with a starch adhesive and an emulsion of a water resistant agent, is supplied from a stock tank 1 to the feed tank 2 of a conventional brush coater. Additional stock tanks may be arranged in the connection 3 to assist in maintaining a uniform supply of the coating composition. A revolving brush 4, dipping into the composition in the tank 2, splatters a rough film of the coating composition on the paper stock 5 as it passes this brush, and this rough film is then "doctored" to a smooth film of uniform weight by additional brushes 6 which vibrate both longitudinally and transversely over the surface of the paper. After a travel sufficient to permit a preliminary "set" of the coating, the coated paper is picked up by conveyer arms 7 which carry it in festoons through a warm air drier 8. From the drier, the coated paper passes through one or more pairs of calender rolls 9. The coating composition is made up in the several pieces of equipment discharging into the tank 1.

The coating pigment is suspended in an aqueous dispersion of the starch adhesive in tank 10. A mixture of the water resistant agent, an emulsifying agent, and a plasticizer if one is used is prepared in the heated kettle 11, and is emulsified, in the jacketed kettle 12 equipped with an appropriate stirrer, with an aqueous solution of ammonia which may include an additional stabilizer for the emulsion supplied from tank 13. The emulsion is incorporated in the pigment suspension as the latter passes through the screen 14 into the stock tank 1.

In the illustrated embodiment of the practice of my invention, it is essential that the emulsion of the water resistant agent break after the paper being coated passes point C and before dehydration is completed, at point E for example. As the paper leaves the brush 4, the coating is in the form of a rough film. As it travels from point B to point C the coating is doctored to a smooth surface and to a uniform weight by the vibrating brushes 6. Between points C and D sufficient time must elapse to permit a preliminary set sufficient to withstand flexure over the conveyer arms 7 carrying the paper through the drier 8. It is advantageous to have the emulsion break at about point D or shortly thereafter in the drier 8.

The following example will illustrate the types of starch adhesives, emulsions of water resistant agents and plasticizers useful in carrying out my invention: 460 pounds of corn starch in 1000 pounds of water are converted, with an appropriate conversion enzyme, after bringing the pH to 7.1 by addition of borax, by cooking at 75° C. for 30 minutes. The conversion is stopped by holding the mixture at 97° C. for 10 minutes. The mixture is then diluted with 840 pounds of cold water. The Ford viscosity at 60° C. of the diluted mixture approximates 45 seconds. An amount of this mixture equivalent to 310 pounds of converted starch, on a dry basis, is added, after being brought to a temperature of 80° C., to 1200 pounds of clay of coating pigment quality. The conventional addends to control whiteness, brilliance, etc., may also be included. This pigment suspension may be formed in tank 10 in the illustrated apparatus for example. 100 pounds of an ester gum, 50 pounds of a light petroleum lubricating oil, an oil with a viscosity approximating 55 seconds at 100° F. Saybolt Universal for example and 10 pounds of oleic acid are melted together, at a temperature of about 135° C. for example, and then cooled to 70°–80° C. Stearic acid, palmitic acid or lauric acid, for example, can be used in place of oleic acid. A mixture of 10 pounds of 26° Bé. ammonia and 20 pounds, dry weight, of the same starch conversion product previously described in 60 pounds of water is slowly stirred, after being brought to about 60°–70° C., into the cooled ester gum melt to form a viscous, milky emulsion. The ammonia is added to the dispersion of the starch conversion product in the water just prior to addition of this mixture to the ester gum melt. Monoethyl amine or diethyl amine, for example, can be used in place of ammonia. This emulsion may be formed in kettle 12 in the illustrated apparatus for example. The coating composition is formed by incorporating 16 pounds of the emulsion, after dilution with 160 pounds of water, in the pigment suspension previously described. The incorporation of the emulsion in the pigment suspension may be effected in the screen 14 in the illustrated apparatus for example.

In the foregoing example, the petroleum oil is effective as a water repellent plasticizer of the coating pigment and the converted starch included in the emulsion acts as an additional stabilizer.

In general: The proportion of starch adhesive advantageously used approximates about 15%–25% by dry weight on the coating pigment. A relatively soft surface is obtained using 15% and a relatively hard surface using 25%. The proportion of the emulsion of the water resistant agent advantageously used approximates about 5%–20% by dry weight on the starch adhesive. Lower proportions tend to impart insufficient resistance to water and higher proportions tend to make the surface less wettable than it should be. The foregoing emulsion proportions are stated on the basis of an emulsion containing about 40%–60% by weight of the water resistant agent, that is prior to dilution.

For use with a brush coater, as in the illustrated apparatus, the coating composition may comprise, for example, 25%–50% solids by weight. For use with a roll coater, the coating composition may comprise, for example, 40%–70% solids by weight.

Paper surfaced on one side with the coating composition described specifically in the foregoing example in accordance with my invention, the dry weight of the coating per side of the paper per 500 count ream of 25" by 38" sheets being 10 pounds, compares favorably, for lithographic printing, with paper carrying the same weight of coating pigment applied with a casein adhesive. The actual weight of starch adhesive used may somewhat exceed, by 10%–20% for example, the weight of casein used to secure a comparable surface, but the cost of starch being substantially lower than that of casein this is not a cost burden. Such paper, coated in accordance with my invention, supercalenders well, and can be printed with uncut, that is undiluted, lithographic ink. The surface is not degraded or impaired by the wetting involved in lithographic printing and such wetting does not tend to extract any component of the coating. The paper exhibits the same properties with respect to water and the aqueous dopes ordinarily used, aqueous glycerine for example.

My invention thus provides for the manufacture of coated paper meeting requirements such as those of lithographic printing with starch adhesives in place of the casein adhesives hitherto used. The advantages secured include those derived from the lower cost and greater availability of starch adhesives. Coated paper produced by my invention, has, however, other advantages such as those noted with respect to calendering and the use of uncut ink.

I claim:

1. In the manufacture of coated paper with a water resistant but wettable surface, the improvement which comprises applying to the paper, in an aqueous medium, a coating pigment, a starch adhesive and an emulsion of an ester gum, dehydrating the applied film and breaking the emulsion during dehydration of the coating on the paper.

2. In the manufacture of coated paper with a water resistant but wettable surface, the improvement which comprises applying to the paper, in an aqueous medium, a coating pigment, a starch adhesive and an emulsion of an ester gum, and a water-repellent plasticizer for the pigment, dehydrating the applied film and breaking the emulsion during dehydration of the coating on the paper.

3. In the manufacture of coated paper with a water resistant but wettable surface, the improvement which comprises applying to the paper, in an aqueous medium, a coating pigment, a starch adhesive and an emulsion of an ester gum, the starch adhesive being about 15%–25% by dry weight on the pigment and the emulsion being about 5%–20% by dry weight on the starch adhesive, dehydrating the applied film and breaking the emulsion during dehydration of the coating on the paper.

4. In the manufacture of coated paper with a water resistant but wettable surface, the improvement which comprises applying to the paper, in an aqueous medium, a coating pigment, a starch adhesive and an emulsion of an ester gum stabilized with a volatile base, dehydrating the applied film and breaking the emulsion by liberating the volatile base during dehydration of the coating on the paper.

WILLIAM LUTTON CRAIG.